United States Patent
Behrendt et al.

(10) Patent No.: US 9,421,486 B2
(45) Date of Patent: Aug. 23, 2016

(54) NANOFIBER COATING, METHOD FOR ITS PRODUCTION, AND FILTER MEDIUM WITH SUCH A COATING

(71) Applicant: MANN+HUMMEL GMBH, Ludwigsburg (DE)

(72) Inventors: Nico Behrendt, Wolfsburg (DE); Sylvia Beier-Moys, Beilstein (DE); Bjoern Schmid, Stuttgart (DE); Anton Kreiner, Reisbach (DE)

(73) Assignee: MANN+HUMMEL GMBH, Ludwigsburg (DE)

( * ) Notice: Subject to any disclaimer, the term of this patent is extended or adjusted under 35 U.S.C. 154(b) by 0 days.

(21) Appl. No.: 14/517,825

(22) Filed: Oct. 18, 2014

(65) Prior Publication Data

US 2015/0107207 A1    Apr. 23, 2015

(30) Foreign Application Priority Data

Oct. 19, 2013   (DE) .......................... 10 2013 017 394

(51) Int. Cl.
| | |
|---|---|
| *B01D 46/00* | (2006.01) |
| *B01D 39/16* | (2006.01) |
| *D01D 5/00* | (2006.01) |
| *B01D 46/54* | (2006.01) |

(52) U.S. Cl.
CPC ........ B01D 39/1623 (2013.01); B01D 46/0001 (2013.01); D01D 5/003 (2013.01); D01D 5/0069 (2013.01); B01D 46/546 (2013.01); *D01D 5/0084* (2013.01); *D10B 2505/04* (2013.01); *Y10T 442/626* (2015.04)

(58) Field of Classification Search
CPC ............................ B01D 39/1623; B01D 46/01
USPC ............... 55/501, 511, 524; 425/174.8 E; 442/351, 330, 370; 264/465
See application file for complete search history.

(56) References Cited

U.S. PATENT DOCUMENTS

| | | |
|---|---|---|
| 6,520,425 B1 | 2/2003 | Reneker |
| 6,623,548 B1 | 9/2003 | Gordon et al. |
| 2012/0040581 A1* | 2/2012 | Kim .............................. 442/330 |

FOREIGN PATENT DOCUMENTS

DE   102009026277 A1   4/2010

OTHER PUBLICATIONS

Additives to improve the electret properties of isotactic polypropylene, published Jan. 17, 2007.
Piezo- and pyroelectricity of a polymer-foam space-charge electret, published Jan. 23, 2001.
Piezoelectricity of Cellular Polypropylene Films Expanded by a Dichlormethane Evaporation Process, published 2008.

* cited by examiner

*Primary Examiner* — Robert Clemente
*Assistant Examiner* — Karla Hawkins
(74) *Attorney, Agent, or Firm* — James Hasselbeck

(57) ABSTRACT

A filter medium, in particular for air filtration, is provided with a substrate and at least one nanofiber layer applied onto the substrate. The nanofiber layer has cavities in or between the nanofibers. In a method for producing the nanofiber layer, a spinning solution for electrospinning from a polymer solution by a spinning electrode and a counter electrode is provided, wherein electrical voltage is applied to the spinning solution and air is passed through the spinning solution. The nanofibers produced by the spinning electrode are deposited onto the substrate that is moved past the counter electrode.

13 Claims, 8 Drawing Sheets

NANOFIBER COATING, METHOD FOR ITS PRODUCTION, AND FILTER MEDIUM WITH SUCH A COATING

CROSS-REFERENCE TO RELATED APPLICATION

This application claims the benefit of German patent application No. 10 2013 017 394.9 filed Oct. 19, 2013.

BACKGROUND OF THE INVENTION

The present invention concerns filter media in general. In particular, the invention concerns those filter media that are provided with a nanofiber coating. Moreover, the invention concerns a method for producing such filter media.

For the purpose of air filtration, it is advantageous when, for the filtration task, electrical charges are permanently available for a targeted separation of particles by electrostatic interaction (so-called electret effect). Such electrical charges on the surface of an air filter medium can increase the efficiency of the particle separation; however, they dissipate very quickly, in particular in the presence of high air humidity and high temperatures. In order to solve this problem, a known approach is based on using charge-stabilizing additives. Problematic in this context is however that the additives are effective only within very narrow limits, for example, only within a very narrow concentration and processing window (for example, cooling rate of the polymer melt during processing) of the additives, as described by N. Mohmeyer et al., "Additives to improve the electret properties of isotactic polypropylene", Polymer, 2007, vol. 48, pages 1612-1619, Elsevier Ltd. Also, the additive effect is often limited only to a certain polymer matrix and a certain kind of charging.

A further known approach is based on so-called triboelectric media. For this purpose, fiber mixtures of polypropylene (PP) and polyvinylchloride (PVC) or polypropylene (PP) and polyacrylonitrile (PAN) are used. For example, U.S. Pat. No. 6,623,548 B1 discloses an electrostatically charged filter material that comprises a mixture of PP fibers and fibers selected from the group consisting of halogen-free acrylic fibers, PVC fibers or a mixture of halogen-free acrylic fibers and PVC fibers. Even though in this context the charges dissipate also by the action of air humidity and temperature, these media however always automatically recharge themselves by friction (caused by the air flow). A disadvantage is that the use of PVC in the automotive industry is no longer desired and the prices for PAN are relatively high because it is also used for manufacturing carbon fibers.

It is known that closed cavity polymeric structures (polymer foams) can be charged electrically. In this context, by applying external electric fields (for example, corona discharge), electrical breakdowns are generated in the closed cavities. These effects have been described, for example, by G. S. Neugeschwandtner et al., "Piezo- and pyroelectricity of the polymer-foam space-charge electret", J. of Appl. Physics, 2001, vol. 89 (8), pp. 4503-4511. The cavities can be produced, for example, by saturation of a polymer film with a low-boiling liquid and subsequent sudden evaporation of the liquid (compare N. Behrendt et al.; "Piezoelectricity of Cellular Polypropylene Films Expanded by a Dichloromethane Evaporation Process", Advanced Engineering Materials, 2008, vol. 10, no. 1-2, pp. 120-125).

U.S. Pat. No. 6,520,425 B1 discloses the so-called electroblowing method in which air as a "shaping" medium is flowing about a nanofiber-generating nozzle in order to generate particularly thin fibers. It is however not possible to generate cavities in the thus produced nanofibers by means of this method.

There is therefore a need to make available a filter medium with quasi-permanent charges for filtration.

SUMMARY OF THE INVENTION

It is therefore the object of the present invention to make available a filter medium with quasi-permanent charges for air filtration that does not exhibit the aforementioned disadvantages. Moreover, it is an object of the present invention to provide a method for producing such a filter medium.

These and further objects are solved by the filter medium that is characterized in that the nanofiber layer comprises cavities in or between the nanofibers. The object is further solved for the method in that a spinning solution is provided for electrospinning of nanofibers from a polymer solution by means of a spinning electrode and a counter electrode; an electrical voltage is applied to the spinning solution; air is passed through the spinning solution; and the nanofibers that are produced by the spinning electrode are deposited onto a substrate that is being moved past the counter electrode.

Advantageous embodiments of the invention are disclosed in the dependent claims.

In a special embodiment of the invention, the substrate is a nonwoven substrate or cellulose substrate.

In a preferred embodiment of the invention, the cavities have electrical charges in their interior.

In an advantageous embodiment, the diameters of the cavities are within a range of 0.1 to 10 μm.

In a preferred embodiment of the invention, the coating density of the fibers with cavities is in the range of 0.01 to 2%, preferably in the range of 0.5 to 1%.

Preferably, the cavities are charged by electrical fields after formation of the nanofibers.

Also in accordance with the invention, charging is achieved by generating electrical breakdowns in the cavities.

In a preferred embodiment of the invention, in a device according to the invention for producing nanofibers, air bubbles are generated in the spinning solution by means of a cannula.

In a particular embodiment of the invention, generation of the size of the air bubbles is controllable.

The filter element according to the invention can be used in particular for engine intake air filtration and cabin air filtration where a high degree of separation is required.

BRIEF DESCRIPTION OF THE DRAWINGS

The invention will be explained in the following in more detail with the aid of the drawings.

DESCRIPTION OF PREFERRED EMBODIMENTS

The invention is based on the idea of making available quasi-permanent electrical charges for a targeted separation of particles by electrostatic interaction.

For this purpose, nanofiber coatings are proposed comprising nanofibers in which, by means of a special electrode arrangement, cavities are introduced in a targeted fashion in or between the nanofibers. In the special electrode arrangement, a spinning solution is provided and electric voltage applied thereto.

Figure 1:
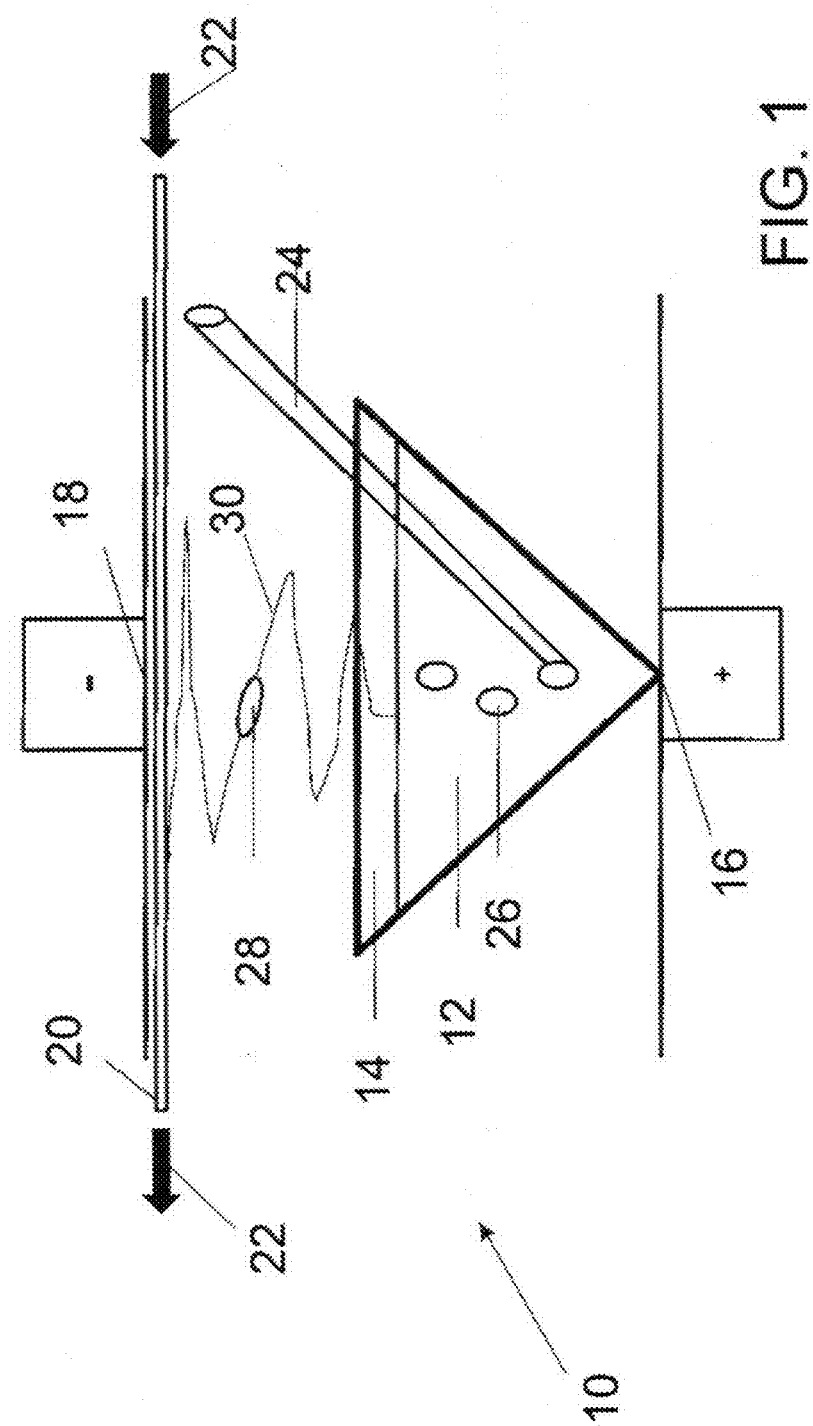
FIG. 1 shows schematically the configuration of a device for producing nanofibers according to the invention.

FIG. 1 shows schematically the configuration of the electrode arrangement 10 according to the invention.

In this context, a polymer in the form of a polymer melt or in the form of a solution 12 (spinning solution) in a vessel 14 (spinning tub) is introduced into an electrical field and, under the effect of the field, is spun to fibers. One electrode 16 is configured in this context frequently as an injection nozzle (spinning electrode). A cone-shaped deformation of the droplet of the spinning solution that is coming from the spinning nozzle 16 is effected in the direction toward the counter electrode 18 by the applied voltage. A substrate 20 is moved past the counter electrode (compare arrows 22) and forms a receiving device for the spun fibers 30. On the path to the counter electrode, the solvent that is contained in the spinning solution evaporates (or the melt solidifies) and, on the substrate 20, solid fibers with diameters of several μm down to a few nm are deposited at high speed. The described arrangement is suitable for producing nanoparticle layers as well as nanofiber layers.

According to the invention, by means of a suitable air distribution device, for example, a cannula 24, air in the form of small air bubbles 26 is blown through the spinning solution 12 by means of compressed air. At a defined pressure, anisotropic cavities 28 can be produced in or between the fibers in this way. These cavities with a diameter in the μm range can be subsequently charged by external electrical fields (for example, corona discharge) in that in the cavities electrical breakdowns are generated (compare FIG. 2). The charged cavities in the nanofiber coating can thus effect an efficient separation of particles.

In the present invention, the air is introduced by means of a cannula 24 directly into the solution 12 that is to be spun. With appropriate control, i.e., by means of affecting the degree of bubble formation (by means of air quantity or air pressure), no constant air flow is produced in this context, as e.g. in electroblowing, but bubbles 26 are constantly generated instead.

The substrate 20 can be, for example, a polymer fiber fleece (nonwoven), but a cellulose substrate can be used also.

Figure 2:
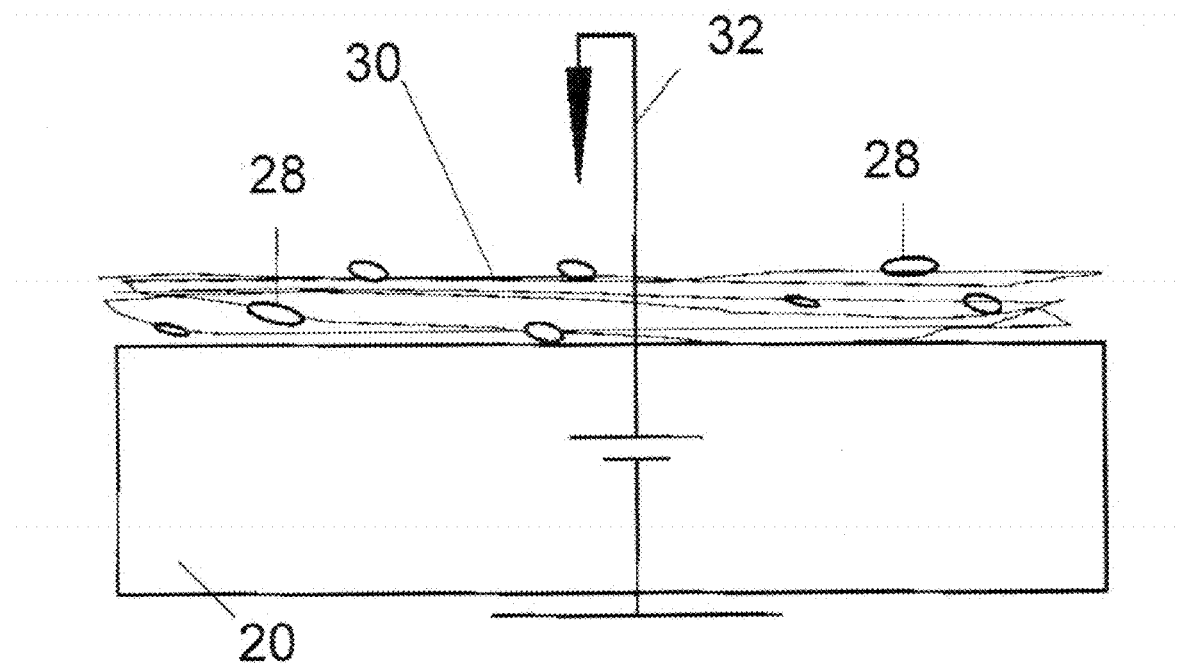
FIG. 2 shows schematically charging of the cavities in the nanofibers produced according to the invention.

FIG. 2 shows schematically the electrical charging of the generated cavities 28. In this context, the substrate 20 is introduced into a so-called "charging station" 32 where, by an external electrical field (for example, corona discharge), the cavities 28 are charged by generating electrical breakdowns.

Figure 3:
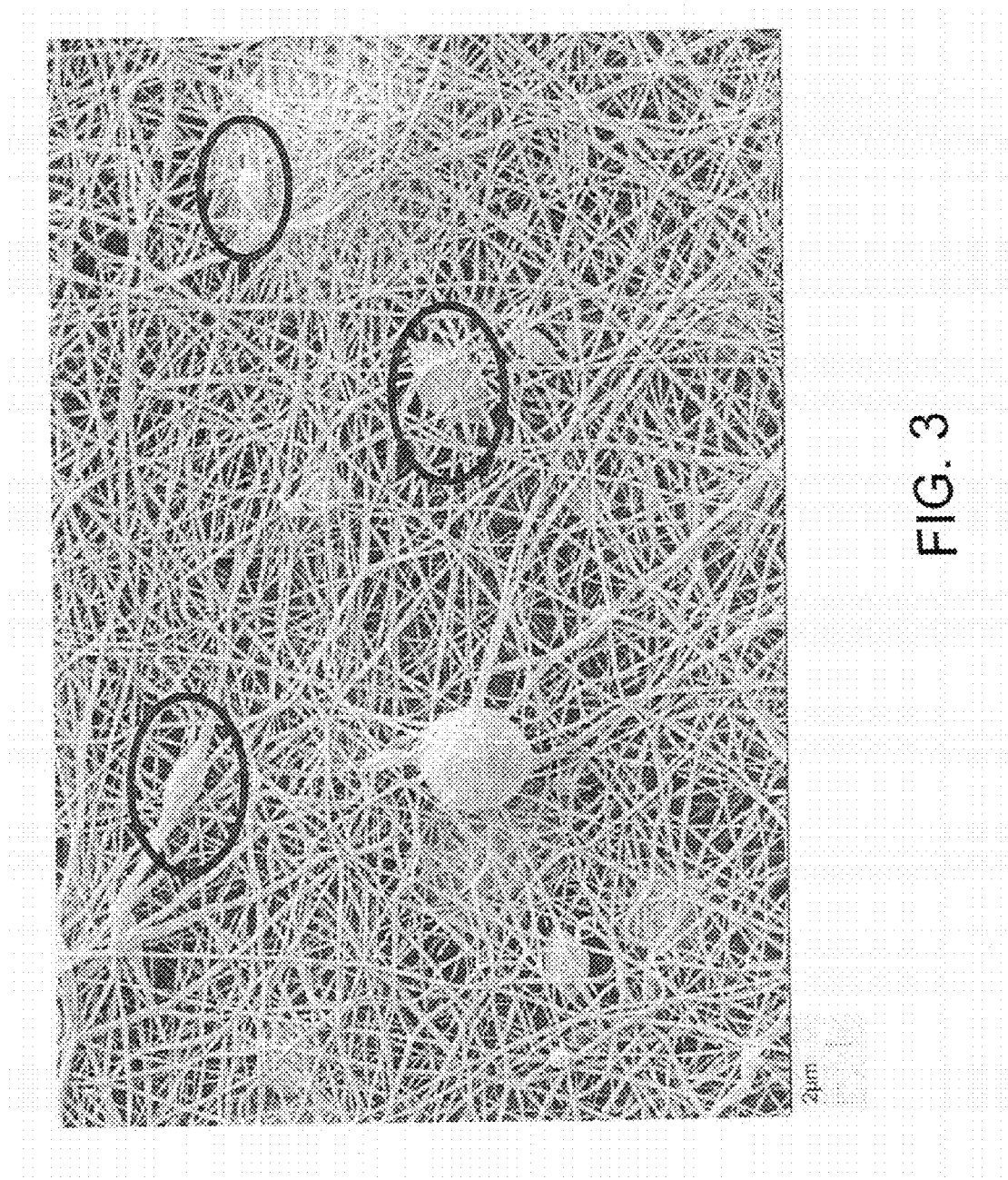
FIG. 3 is a scanning electron microscope (SEM) image of a substrate coated with the nanofibers according to the invention at 2 μm scale.

FIG. 3 shows an SEM image of the nanofiber coating with cavities which are marked by the indicated circles. The size distribution of the cavities is in the range of 0.5 to 10 μm, the coating density is in the range of 0.01 to 2%, in particular in the range of 0.5 to 1%.

Figure 4:
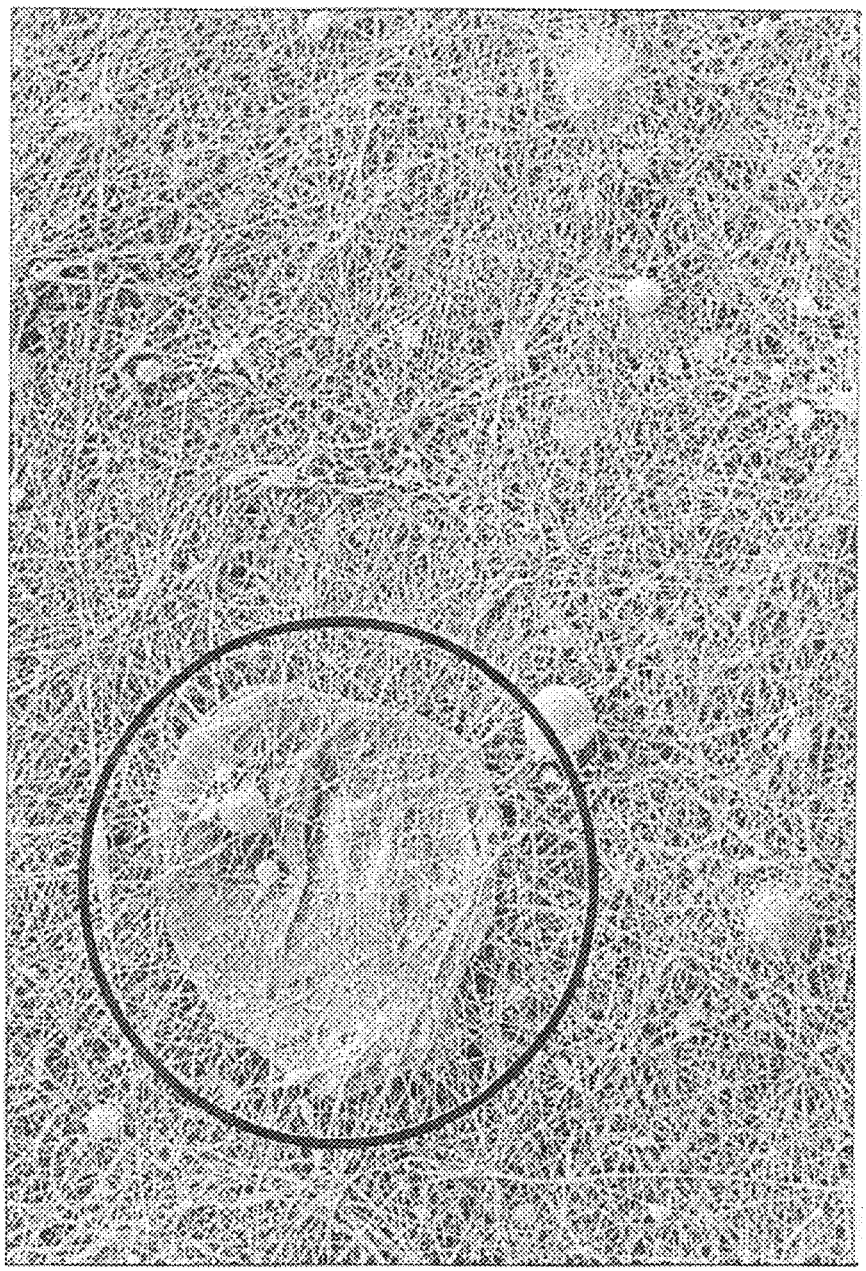
FIG. 4 is a scanning electron microscope (SEM) image of a substrate coated with the nanofibers according to the invention at 10 μm scale.

FIG. 4 shows an SEM image of a "flat", i.e., non-spherical cavity. This image is evidence that the bubbles generated with the method according to the invention are indeed hollow because the spherical cavity has collapsed and is thus "flat".

Figure 5:
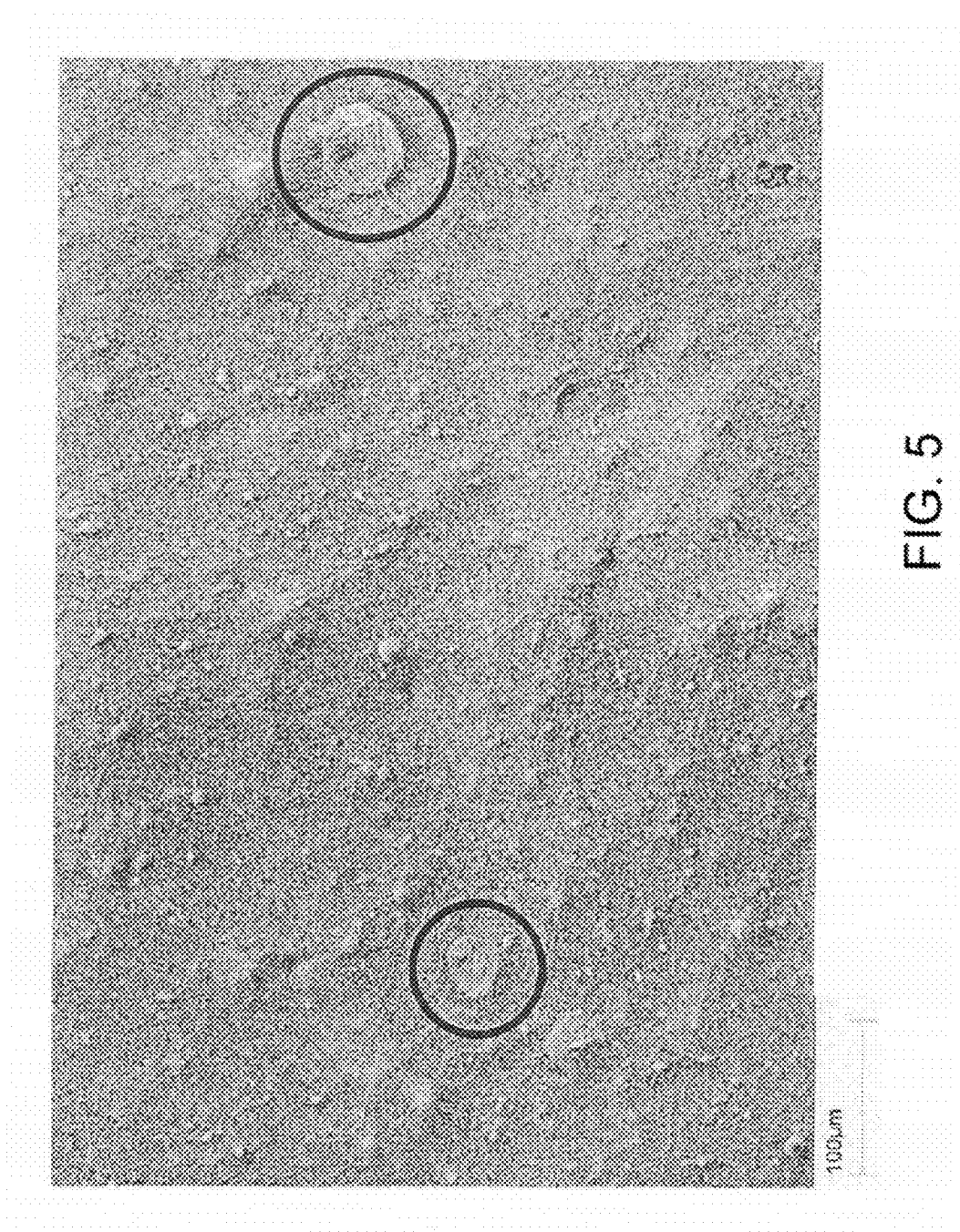
FIG. 5 is a scanning electron microscope (SEM) image of a substrate coated with the nanofibers according to the invention at 100 μm scale.

The SEM image of FIG. 5 shows that the cavities are distributed relatively uniformly across the surface of the fibers.

EXAMPLES

As a polymer, polyamide (BASF Ultramid B24) was used. Generally, the following polymers can be employed however: Polyamides (nylons), polyaramides, polyimides, polybenzimidazoles, polyetherimides, polyacrylates, polyacrylonitriles, polyesters (in particular polyethylene terephthalate and polybutylene terephthalate), polyolefins (in particular polyethylene and polypropylene), polyanilines, polyethylene oxides, polyethylene naphthalates, styrene-butadiene rubber, polystyrene, polyvinylchloride, polyvinylidene chloride, polyvinylidene fluoride, polyvinylbutylene, polyacetal, polyalkylene sulfides, polyphenylene sulfide, polyarylene oxides, polysulfones, polyetherketones, as well as mixtures thereof.

For the spinning experiments, a laboratory electrospinning device of the company Elmarco (NS Lab 500) with the electrode contacting provided therefore was used.

The spacing between the wire (spinning) electrode and counter electrode was 170 mm. The solutions (approximately 50 g each) were filled into the provided vessel (spinning tub) of the electrospinning apparatus. The cannula with a diameter of 0.25 mm (of course, other cannula diameters are also possible) was positioned centrally in the vessel so that the opening for introducing the air bubbles was located approximately 1 cm above the bottom of the vessel and the cannula, on the other hand, was covered by approximately 1 cm of spinning liquid. Subsequently, air at a rate of 1 l/min was passed through the spinning solution. An electrical voltage of 80 kV was applied between the spinning electrode and the counter electrode. The paper substrate was coated for 1 minute with the spinning electrode. The resulting pattern was examined by scanning electron microscope (SEM).

The following polyamide batches were produced:

Example 1

8 g of polyamide (BASF Ultramid B24)
29.2 g of formic acid (99%)
58.3 grams of acetic acid (96%)

Example 2

12.5 g of polyamide (BASF Ultramid B24)
29.2 g of formic acid (99%)
58.3 g of acetic acid (96%)

Example 3

16 g of polyamide (BASF Ultramid B24)
29.2 g of formic acid (99%)
58.3 g of acetic acid (96%)

The substrate for coating with the nanofibers was a paper medium; width 50 cm; weight per surface area 130 g/m$^2$; thickness 0.44 mm; pressure loss 70 Pa at 7.5 cm/s; and air permeability 215 l/m$^2$ at 200 Pa.

Figure 6:
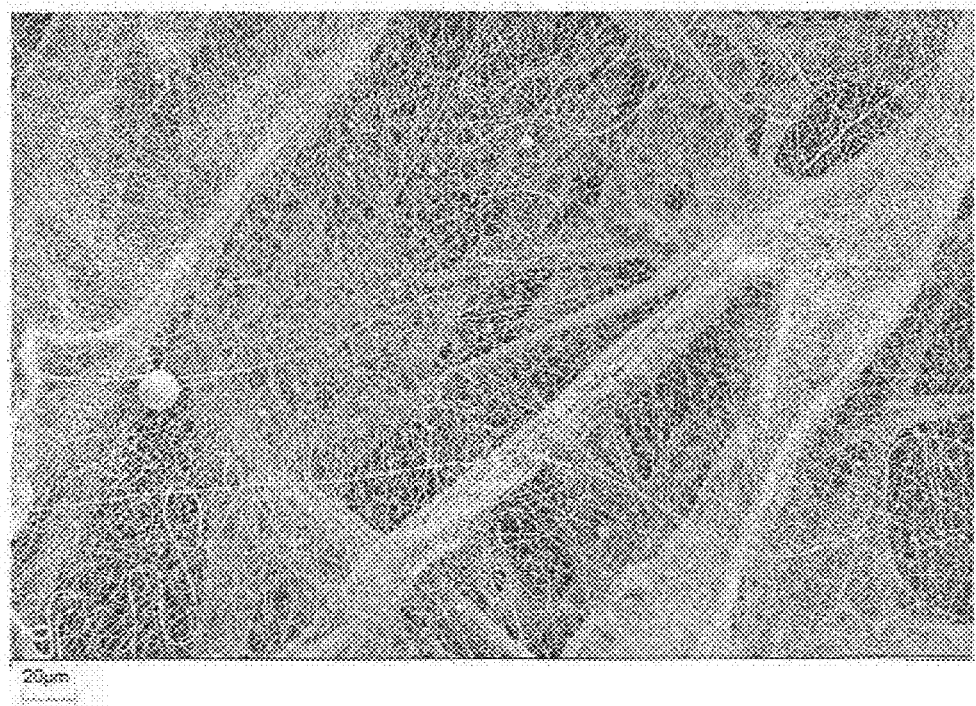
FIG. 6 is a scanning electron microscope (SEM) image of cavities according to a first example of the invention.

Results:

Polyamide batch according to Example 1 (8% PA solution): The diameters of the cavities are on average in the range of approximately 0.5 µm (compare FIG. 6).

Figure 7A:
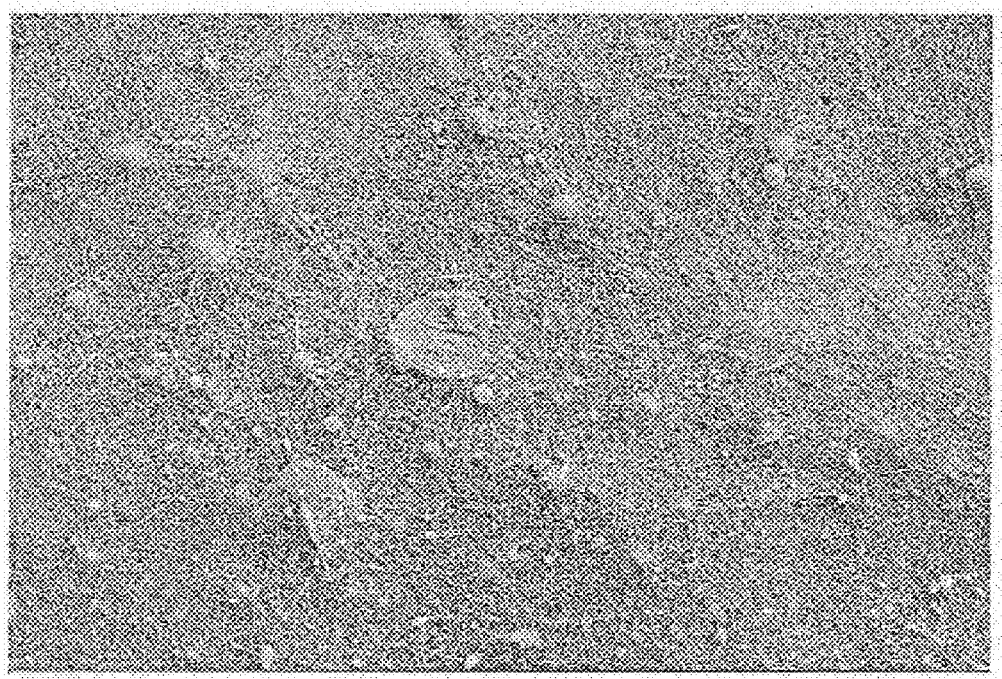
FIG. 7A shows scanning electron microscope (SEM) images of cavities according to a second example of the invention at a first scale.
Figure 7B:
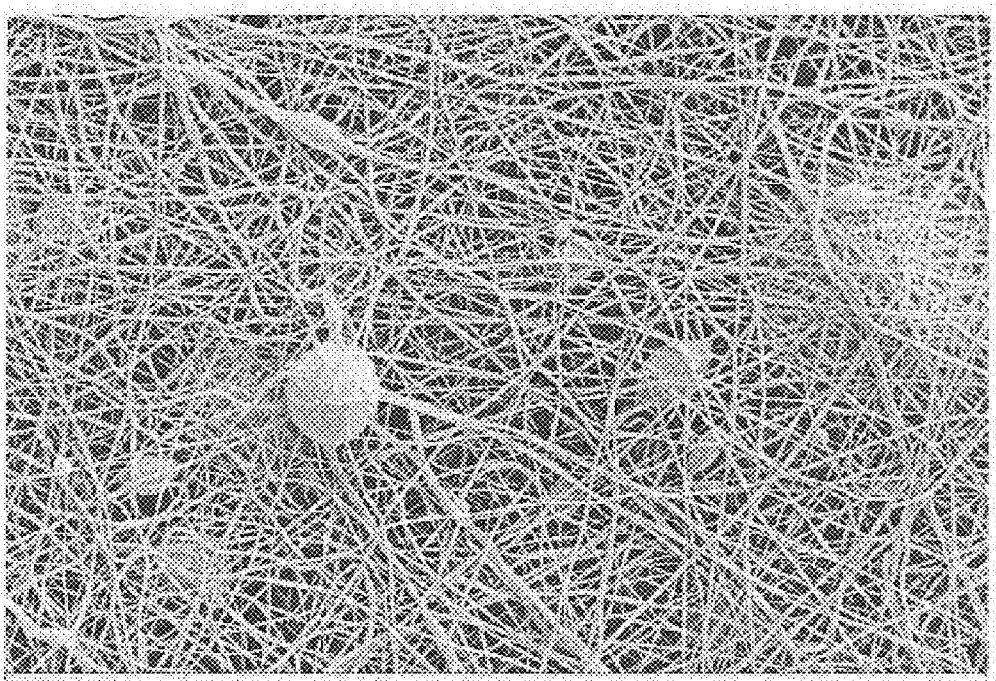
FIG. 7B shows scanning electron microscope (SEM) images of cavities according to a second example of FIG. 7A at a second scale.

Polyamide batch according to Example 2 (12.5% PA solution): The diameters of the cavities are on average in the range of approximately 5 µm (compare FIG. 7); many anisotropic (elongate) cavity structures can be seen.

Figure 8:
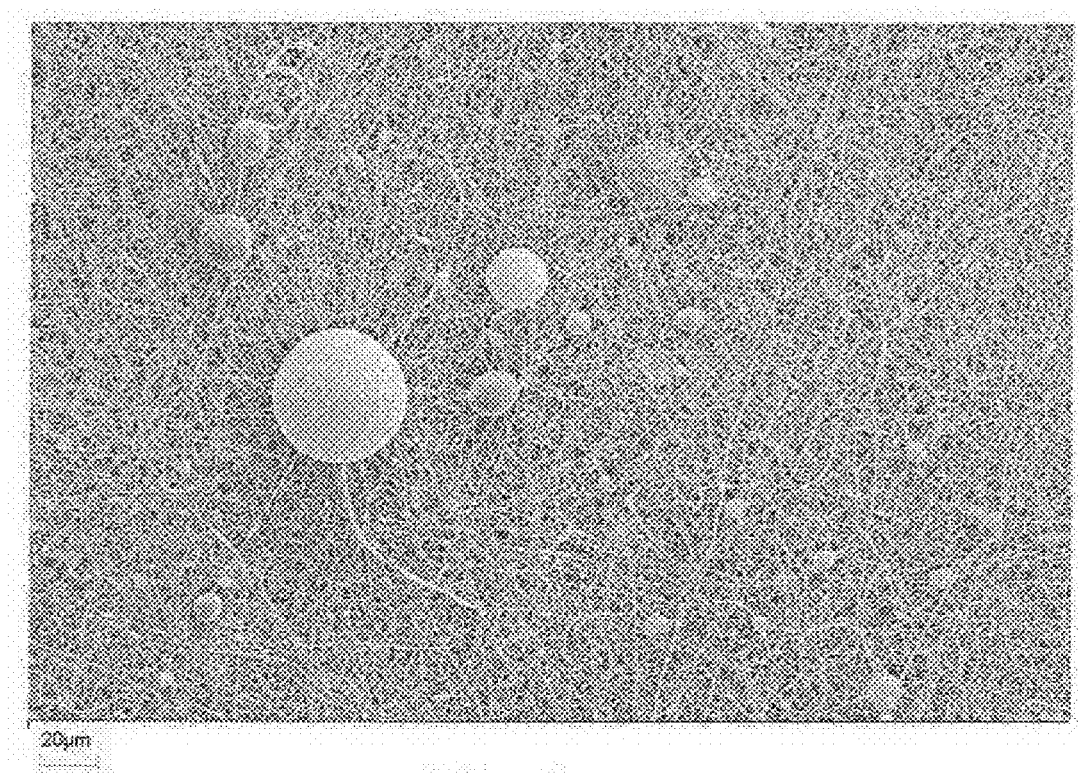
FIG. 8 is a scanning electron microscope (SEM) image of cavities according to a third example of the invention.

Polyamide batch according to Example 3 (16% PA solution): The diameters of the cavities are on average in the range of approximately 10 µm (compare FIG. 8).

The nanofiber coatings with integrated (anisotropic) cavities can be produced in a simple way by use of the electrode arrangement according to the invention. In contrast to the triboelectric media known in the prior art, no additional fiber material, i.e., no fiber mixture, is required. Size and quantity of the cavity structures can be controlled by the parameters of the electrospinning device (air quantity, voltage, electrode spacing). The charges of the cavities are within the interior of the cavities on their inner side. In contrast to the known electret media, discharge is therefore hardly possible by external influences, i.e., the charges are quasi-permanent. In this way, solutions can even be spun which otherwise cannot be spun under these conditions.

What is claimed is:

1. A filter medium comprising
a substrate and
at least one nanofiber layer applied onto the substrate,
wherein the at least one nanofiber layer comprises nanofibers having hollow cavities formed into at least some of the nanofibers of the at least one nanofiber layer;
wherein the nanofiber layer has at least one individual hollow cavity enclosing nanofiber, wherein each individual hollow cavity enclosing nanofiber, taken alone, has a hollow cavity formed entirely within an interior of the individual hollow cavity enclosing nanofiber.

2. The filter medium according to claim 1, wherein
the substrate is a nonwoven substrate or a cellulose substrate.

3. The filter medium according to claim 1, wherein
the cavities have an interior and carry electrical charges in the interior.

4. The filter medium according to claim 1, wherein
the cavities have a diameter in a range of 0.1 µm to 10 µm.

5. The filter medium according to claim 1, wherein
a coating density of the nanofibers with the cavities is in a range of 0.01% to 2%.

6. The filter medium according to claim 5, wherein
the range of the coating density is 0.5% to 1%.

7. A method for producing a filter medium according to claim 1, comprising:
providing a spinning solution for electrospinning of nanofibers from a polymer solution by a spinning electrode and a counter electrode;
applying an electrical voltage to the spinning solution;
passing air through the spinning solution infusing air bubbles into the spinning solution; and
generating nanofibers from the air bubble infused spinning solution;
depositing the nanofibers produced by the spinning electrode onto a substrate that is being moved past the counter electrode, the nanofibers having hollow cavities formed into at least some of the nanofibers, wherein the nanofibers have at least one individual hollow cavity enclosing nanofiber, wherein each individual hollow cavity enclosing nanofiber, taken alone, has a hollow cavity formed entirely within an interior of the individual hollow cavity enclosing nanofiber.

8. The method according to claim 7, wherein
the polymer solution is formed of a polymer compound that enables stabilization of separated charge carriers.

9. The method according to claim 7, wherein
the polymer solution is formed of a polymer compound selected from the group consisting of polyamide, polyaramide, polyimide, polybenzimidazole, polyetherimide, polyacrylate, polyacrylonitrile, polyester, polyolefines, polyaniline, polyethylene oxide, polyethylene naphthalate, styrene-butadiene rubber, polystyrene, polyvinylchloride, polyvinylidene chloride, polyvinylidene fluoride, polyvinylbutylene, polyacetal, polyalkylene sulfides, polyphenylene sulfide, polyarylene oxides, polysulfones, polyetherketones, and mixtures thereof.

10. The method according to claim 7, further comprising
charging cavities of the produced nanofibers by electrical fields.

11. The method according to claim 10, wherein
charging is done by generating electrical breakdowns in the cavities.

12. Nanofibers for coating a substrate for producing a filter medium according to claim 1, wherein
the nanofibers comprise cavities in or between the nanofibers.

13. A filter element comprising
a filter medium according to claim 1.

* * * * *